United States Patent
Van Boven

(10) Patent No.: US 7,611,098 B2
(45) Date of Patent: Nov. 3, 2009

(54) FLIGHT MANAGEMENT PROCESS FOR AN AIRCRAFT

(75) Inventor: Machiel Van Boven, Toulouse (FR)

(73) Assignee: Airbus France, Toulouse (FR)

( * ) Notice: Subject to any disclaimer, the term of this patent is extended or adjusted under 35 U.S.C. 154(b) by 363 days.

(21) Appl. No.: 11/334,548

(22) Filed: Jan. 19, 2006

(65) Prior Publication Data

US 2006/0273928 A1  Dec. 7, 2006

Related U.S. Application Data

(60) Provisional application No. 60/644,533, filed on Jan. 19, 2005, provisional application No. 60/645,050, filed on Jan. 21, 2005.

(30) Foreign Application Priority Data

Aug. 1, 2005  (FR) .................................. 05 08212

(51) Int. Cl.
*G05D 1/12* (2006.01)

(52) U.S. Cl. ...................... 244/183; 244/186; 244/187; 244/220; 244/221

(58) Field of Classification Search ......... 244/183–186, 244/220, 221, 187
See application file for complete search history.

(56) References Cited

U.S. PATENT DOCUMENTS 3,589,648 A * 6/1971 Gorham et al. ............. 244/186
3,666,929 A * 5/1972 Menn .......................... 701/16
3,690,598 A * 9/1972 Buchholz et al. ........... 244/182
3,752,967 A * 8/1973 Vietor ......................... 701/15
3,786,505 A * 1/1974 Rennie ........................ 342/33
3,868,497 A * 2/1975 Vietor ........................ 701/121
4,042,197 A * 8/1977 Boyle et al. ................. 244/183
4,232,839 A * 11/1980 Sicre et al. .................. 244/188
4,633,404 A * 12/1986 Greeson et al. ............... 701/3
4,792,906 A * 12/1988 King et al. .................... 701/5
4,825,374 A * 4/1989 King et al. .................... 701/5
5,445,021 A * 8/1995 Cattoen et al. ............ 73/178 R
6,154,693 A * 11/2000 Aberschitz et al. ........... 701/16

* cited by examiner

*Primary Examiner*—Michael R Mansen
*Assistant Examiner*—Philip J Bonzell
(74) *Attorney, Agent, or Firm*—Oblon, Spivak, McClelland, Maier & Neustadt, L.L.P.

(57) ABSTRACT

A process wherein an aircraft starts from a cruising position by flying at a cruising speed to reach a position that intercepts the glide slope. The process can include the steps of decelerating from the begin descent speed and the begin descent altitude of the aircraft during a first descent phase with a first flight path angle until reaching a predetermined speed corresponding to an aircraft speed at which the aircraft flaps are extended for transitioning to a first intermediate position; following a second phase of descent at a considerably constant speed with a second flight path angle; and decelerating during a third phase of descent with a third flight path angle to reach the glide slope interception position. The aircraft slats and/or flaps adopt their first intermediate position considerably when transitioning from the second to the third phase of descent.

9 Claims, 2 Drawing Sheets

FLIGHT MANAGEMENT PROCESS FOR AN AIRCRAFT

CROSS-REFERENCE TO RELATED APPLICATIONS:

This application claims priority to French Application No. 05 08212, filed Aug. 1, 2005, U.S. Provisional Application No. 60/644,533, filed Jan. 19, 2005 and U.S. Provisional Application No. 60/645,050, filed Jan. 21, 2005, the entire contents of which are hereby incorporated by reference.

BACKGROUND OF THE INVENTION

1. Field of the Invention

The invention involves a flight management process, such as for landing an aircraft. The term "landing" includes the approach stage and the touching of the wheel on the landing strip or runway.

2. Discussion of the Background

Generally speaking, when landing, an aircraft loses altitude and reduces its speed to switch from cruising flight conditions to landing conditions. During its descent, the aircraft takes on various configurations. First of all, during flight at cruising speed, the outside surface of the aircraft is the smoothest possible. When it approaches the ground, several stages are foreseen during which the slats and wing flaps of the aircraft are extended. Classically speaking, an aircraft includes at least three distinct configurations with extended slats and wing flaps.

To diminish sound nuisances on the ground around airports, it is already known that the approach phase of aircraft is modified. Classically speaking, to land, an aircraft goes from an altitude when it begins descent to an altitude of about 3000 ft while maintaining a considerably constant speed. The flight path angle of the aircraft during descent is comprised for instance between −2° and −3°. When it arrives at about 3000 feet (this altitude is given as an example and coincides with the generally selected altitude), the aircraft decelerates to an intermediate speed. The aircraft then intercepts the glide slope applicable to the airport and landing strip.

To diminish sound nuisances on the ground, it is known to make a DCA approach ("Continuous Descent Approach"). In this process, there is no more deceleration level at constant altitude but the aircraft decelerates at the same time as it descends and the descent is calculated so as to intercept the glide slope of the applicable airport, without level.

SUMMARY OF THE INVENTION

It has been observed that a CDA approach was beneficial for large aircraft with respect to the sound nuisances on the ground for those living near airports.

The purpose of this invention is to propose a landing process for an aircraft for which the noise level on the ground is minimized. Preferably, this process will permit a considerable reduction in the noise level on the ground for large aircraft as well as for smaller aircraft.

For that purpose, it proposes a flight management process for an aircraft and in particular, for the landing of such an aircraft, with the latter comprising aerodynamic high-lift elements such as movable slats and wing flaps between a fully retracted position and a fully extended position while transitioning through by intermediate positions, a process in which the aircraft starts from a first position that coincides with an altitude called "begin descent altitude" while flying at a speed called "begin descent speed" to arrive at a second interception position of a glide slope and in which the high-lift devices of the aircraft transition from the fully retracted position to a first intermediate extended position, then, possibly to a second intermediate extended position.

According to the invention, this process includes the following steps:

deceleration from the begin descent speed and begin descent altitude of the aircraft during a first descent phase with a first flight path angle, until it reaches a predetermined speed that coincides with an aircraft speed at which its high-lift devices are extended to transition to the first intermediate position.

second descent phase at a considerably constant speed with a second flight path angle;

deceleration of the aircraft during a third phase of descent with a third flight path angle to reach the interception position of the glide slope;

and the high-life devices are extended to adopt their first considerably intermediate position when going from the second to the third descent phase.

This procedure is an optimized procedure that permits reducing the noise levels on the ground near the landing strip. It provides for extending the high-lift devices later than for the known procedures of the previous state of the art. In this case for instance, this involves devices that are called "slats" in English as well as devices also called "flaps" in English. In the rest of the description, as in the claims, for simplification purposes, we will only use the terms "slats" and "flaps".

The descent alignment corresponds to the last phase of flight of the aircraft that is known by the expert in the field as the "Glide Slope". This last phase is generally imposed by the constraints of the landing strip or runway.

The first intermediate position of the flaps coincides for instance with a first deflection position of the slats, while the flaps remain in the retracted position. The second intermediate position coincides for instance with the flaps being extended, with the slats adopting a second deflection position.

In the above process, the first and third flight path angles are for instance, equal, and the second flight path angle is preferably higher, in terms of absolute value, than the first and third flight path angles.

To limit the noise levels during landing even more, the flight management process according to the invention provides that the wing flaps go to a second intermediate extended position, then to a third intermediate extended position, and the landing gear can only be extended when the wing flaps have moved from the second intermediate position to the third intermediate position, that coincides possibly with the final landing position.

Always to limit the noise levels, preferably the wing flaps go from the fully retracted position that coincides with the cruising speed flight configuration of the aircraft in which the outside surface is smooth to the first intermediate position when the aircraft reaches a GDN speed that is lower than the GD speed usually required to go to this first intermediate position. It is also preferable that the wing flaps go from the first intermediate position to the second intermediate position when the aircraft reaches an SN speed that is lower than the S speed usually required to go to this second intermediate position. Speed S is the speed also required during takeoff to go to the configuration in which the wing flaps are in the fully retracted position.

In the flight management process according to the invention, prior to a landing, a calculation stage can be provided to predetermine the various landing stages. This prior calculation is for instance performed backwards and can comprise the following steps:

from the landing strip level, determination of a first flight segment at landing speed and a flight path angle that coincides with the glide slope scheduled for said landing strip and memorized in a navigation system of the aircraft.

from a predetermined altitude of about 300 m, calculation of a second flight segment with a same flight path angle of the backward acceleration of the aircraft, with the engines close to (or at) idling, up to a glide slope interception altitude; this calculation takes into account a possible configuration change of the wing flaps of the aircraft at a speed on the basis of the type of aircraft and its weight.

from the glide slope interception altitude, calculation of a third flight segment with and of a backward acceleration, with the engines closed to (or at) idling, until the aircraft reaches a predetermined speed coinciding with the transition of the smooth external configuration of the aircraft to the first intermediate position of the slats and wing flaps, and determination of the corresponding altitude, with the flight path angle having been predetermined.

calculation of a fourth path segment of the aircraft from the altitude determined during the previous step, at constant speed and with the engines being close to (or at) idling, and calculation of a fifth path segment, in the direction of travel of the aircraft, from the point of departure of the begin descent path, to transition, possibly at constant altitude, from the aircraft speed at the beginning of descent to the speed that coincides with transitioning from the smooth external configuration of the aircraft to the first intermediate position of the wing flaps, and intersection of this fifth segment with the fourth to determine the begin descent path of the aircraft.

This invention suggests that in the course of the descent path of the aircraft towards a landing strip, it is proposed to the pilot to pass from the fully retracted position of the wing flaps to the first intermediate position of the wing flaps of the aircraft either at a first speed that coincides with the speed recommended to transition to the first intermediate position of the wing flaps, or at a speed, below the preceding one that permits reducing the aircraft noise.

This invention also suggests that in the course of the descent path of the aircraft towards a landing strip, it is proposed to the pilot to transition from the first intermediate position of the slats and wing flaps of the aircraft to the second intermediate position of these wing flaps or to a first speed that coincides with the recommended speed for going to the second intermediate position of the wing flaps, or to a speed, lower than the preceding one, that permits reducing the aircraft noise.

This invention also involves a flight management system, characterized by the fact that it includes means for implementing a process as described above as well as an aircraft that includes such a flight management system.

BRIEF DESCRIPTION OF THE DRAWINGS

More details and advantages of the first invention will appear from the description that follows, referenced against the attached diagrams, on which.

DESCRIPTION OF THE PREFERRED EMBODIMENTS

On the first figure, the landing process serving as reference is illustrated. This procedure is the one classically provided in a flight management system (FMS) of an aircraft.

In the description that follows, the altitude values shown are to be considered with respect to the terrain: such an altitude with respect to the terrain is sometimes also called "height".

In the example selected, it is assumed that the aircraft initially is beginning its descent at a given speed and an altitude of 7000 feet (or 2133.6 meters). When this aircraft wants to land at an airport, it starts a first phase of descent during which, at constant speed, it moves from an altitude of 7000 feet to 3000 feet. Once this intermediate altitude of 3000 feet is reached, the aircraft slows down, then, progressively, extends its slats and wing flaps to the first intermediate position (here generally, the wing flaps remain in the retracted position) while continuing its deceleration phase. On the figures, transitioning from the configuration where the aircraft wings are fully smooth to the configuration for which the slats and the wing flaps go to a first intermediate position is represented by reference CONF1. During this deceleration phase, the speed of the aircraft diminishes until it descends below a limit speed called S for which the slats and wing flaps of the aircraft move from their first intermediate position to a second intermediate position.

The aircraft then intercepts the glide slope that coincides with the arrival airport. During this last flight phase, the slats and wing flaps of the aircraft adopt a third extended position (CONF3) and eventually a fourth position also called final extended configuration of the slats and flaps or FINAL CONF. This final position as well as the landing speed must be reached by the time that the aircraft is at an altitude of 1000 feet.

The flight path angle during the first descent phase (from 7000 to 3000 feet) is for instance comprised between $-2°$ and $-2.5°$. In the final landing phase, namely during the glide slope, this flight path angle is for instance $-3°$.

Figure 1:
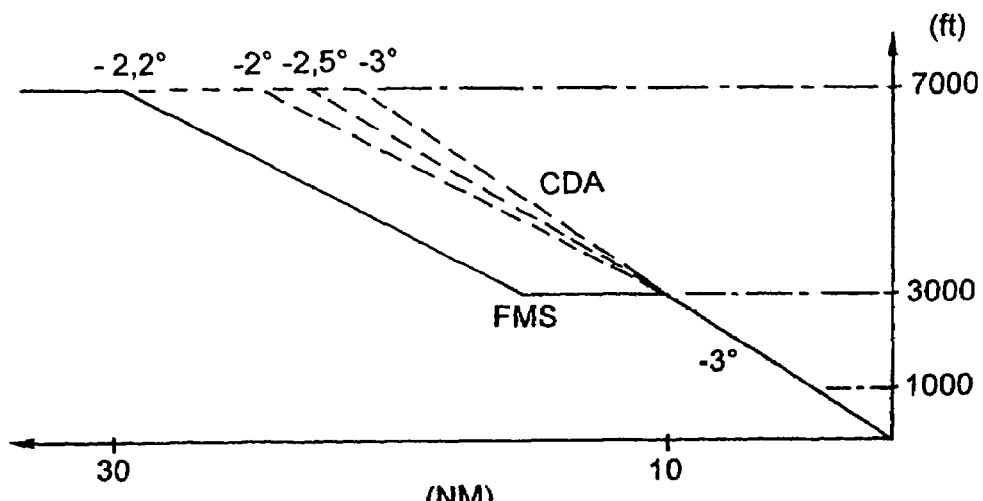
FIG. 1 is a diagram that represents the altitude of an aircraft on the basis of the distance separating it from its point of landing for landing procedures known by the prior state of the art.

Another landing process is known by the name of CDA (for "Continuous Descent Approach"). For such an approach, the descent phases at constant speed and deceleration at constant altitude are grouped in one descent phase with deceleration. For this DCA approach, there is no constant altitude level. The aircraft first descends from its begin descent altitude (for instance 7000 feet) to an altitude of about 3000 feet with a flight path angle between $-2°$ and $-3°$ for instance. FIG. 1 illustrates in a broken line a flight path angle of $-2°$, another of $-2.5°$ and a third one of $-3°$. For this approach, the aircraft goes from its configuration in which it has a smooth external surface (CONF0) to its first configuration with extension of the slats and flaps (CONF1) when it reaches a speed called GD (for "Green Dot"). This limit speed is used during a landing phase of an aircraft as well as during a takeoff phase. Going from the first intermediate position of the slats and flaps of the aircraft to the second intermediate phase of the slats and flaps takes place when the aircraft reaches speed S. This transition is referenced on the drawings by CONF2.

In general, for a classical landing procedure like the one recorded in a flight management system of an aircraft as for the CDA approach procedure, the landing gear of the aircraft is extended after transitioning to the second intermediate position of the slats and flaps or shortly after passing this transition point.

It has been observed that the fact of using the basic CDA process for landing rather than using the process programmed in the flight management system was beneficial for long haul aircraft and was practically without impact for the smaller planes.

The table below summarizes a basic CDA type approach:

| Altitude (in feet) | Event |
| --- | --- |
| 7000 feet | Starting point: engine at idling, smooth outside surface (CONF0), landing gear retracted |
| 7000–3000 feet | Flight path angle: between −2° and −3° (preferably between −2° and −2.5°) Idling thrust GD--->CONF1 Speed S ---> CONF2 |
| About 3000 feet | Interception of the descent axis/slope |
| Below 3000 feet | If CONF2 ---> landing gears extended Speed F ---> CONF3 Speed F ---> FINAL CONF Deceleration to Vapp (Approach speed) |
| After reaching Vapp (approach speed), this is, above 1000 feet | Descent at constant speed Flight path angle −3° Landing |

Figure 2A:
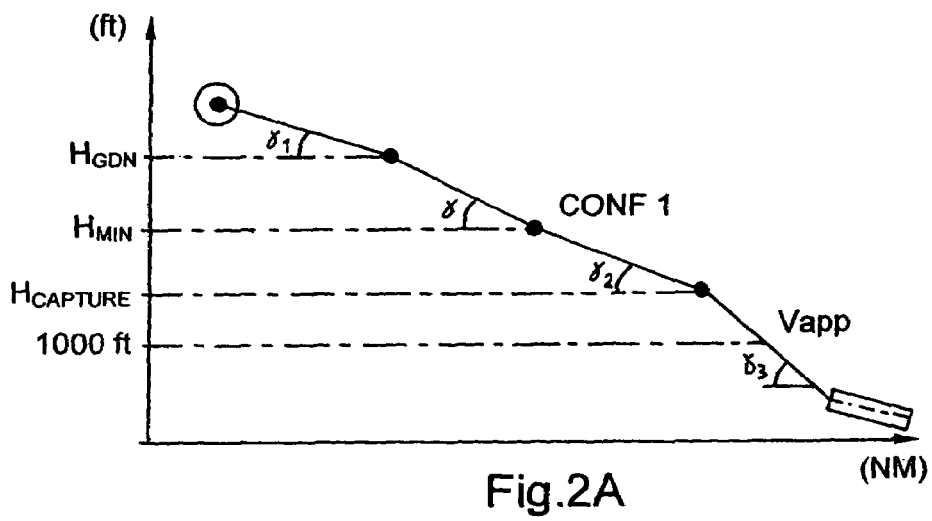
FIG. 2A is a diagram corresponding to the diagram of FIG. 1 for a landing procedure according to the invention.

The diagram of FIG. 2A illustrates an optimized CDA landing procedure. This procedure comprises several stages described below.

Here, it is assumed that the aircraft starts for instance also from an altitude of 7000 feet. During a first phase, the aircraft starts its descent with a flight path angle of $\gamma 1$. During this first phase, the aircraft decelerates to a GDN speed below the GD speed mentioned above but while staying with its smooth configuration (CONF0). At the end of this first phase of descent, the aircraft arrives at an altitude $H_{GDN}$ with speed GDN ($\leq$GD).

Then it starts a second phase of descent with a variable $\gamma$ flight path angle, in other words, not imposed. In terms of an absolute value, $\gamma$ is generally higher than $\gamma 1$. During this second phase of descent, the speed of the aircraft is considerably constant (due to the fact that the speed set point is GDN) and the aircraft descends down to altitude $H_{MIN}$. At the end of this second phase of descent, the slats and flaps of the aircraft move to the first intermediate configuration CONF1: this corresponds for instance to the extended position of the slats of the aircraft with a first angle of deflection. This second phase comes to an end when the aircraft reaches altitude $H_{MIN}$.

The third phase of descent is a deceleration phase. The flight path angle is for instance $\gamma 2$. The aircraft then goes from altitude $H_{MIN}$ to altitude $H_{CAPTURE}$. At this last altitude, the aircraft reaches the final approach axis or slope, which can be of the ILS, MLS, GBAS or SBAS type. Assuming an interception of an ILS axis, the aircraft then intercepts the ILS bundle (Instrument Landing Gear).

Then, it starts the last phase of the landing procedure that is imposed for each airport. During this last phase, the aircraft speed decreases to Vapp and the flight path angle is for instance $\gamma 3$. At the latest, when reaching an altitude of 1000 feet, the aircraft is in its final landing configuration.

As digital example, one sees that $\gamma 1=-2°$ or $-2.2°$ and $\gamma 2=-2°$ or $-3°$ while $\gamma=-2.5°$. Generally, $\gamma 3=-3°$.

The table below summarizes the various data of an optimized landing procedure according to the invention:

| Altitude | Event for optimized approach |
| --- | --- |
| 7000 feet | Idling thrust CONF0: smooth configuration Speed < Cruising speed |
| 7000 feet | Flight path angle: between −2° or −2.5° (or 0°) Reduced thrust Deceleration to GDN speed |
| $H_{GDN}$ | Maintains constant speed, variable flight path angle Descent to an altitude $H_{MIN}$ --->CONF1 |
| $H_{MIN}$ | New flight path angle: −2° or −2.5° Deceleration to SN--> CONF2 |
| About 3000 feet | Interception of the glide axis or slope |
| Less than 3000 feet | Speed F ---> CONF3 If CONF3 ---> landing gear out Speed F ---> FINAL CONF Deceleration to Vapp (approach speed) |
| After reaching the Vapp speed, this is, above 1000 feet | Descent at constant speed Thrust adjusted to a flight path angle of −3° Final landing procedure |

In this table, a speed GDN and a speed SN have been introduced. We have the following equations:

$$GDN=GD-\Delta 1$$

$$SN=S-\Delta 2$$

The values for $\Delta 1$ and $\Delta 2$ however are dependent on the aircraft. Indeed, it has been observed that for each aircraft, it was possible to move the slats and flaps to their first intermediate configuration, to their second intermediate configuration respectively at speeds respectively lower than speeds GD and S usually required.

Altitude $H_{GDN}$ is determined on the basis of the initial point altitude(in the example selected: 7000 feet) and of the deceleration distance required to go from the initial point speed to speed GDN while maintaining a predetermined flight path angle.

Altitude $H_{MIN}$ is a given minimal altitude for an aircraft weight to ensure its stabilization above or at an altitude of 1000 feet above the landing strip.

Speeds GDN and SN do not replace speeds GD and S indicated previously. These are complementary speeds that can be indicated to the pilots on a display screen or monitor as alternate speeds to obtain noise reduction (or basic speeds for the noise reduction procedures). These speeds are then used only in the cases when the safety and airworthiness of the aircraft have not deteriorated. These speeds (GDN and SN or else values $\Delta 1$ and $\Delta 2$) are determined according to the type of aircraft and of its weight.

One observes that speed SN can be reached below 3000 feet but always, above 1000 feet, needless to say.

The optimized approach procedure can be programmed in the flight management system (FMS) of the aircraft. The various parameters are calculated in reverse from the landing strip.

During a first stage, one considers first of all that the Glide Slope has been complied with. This geometric segment is covered at a Vapp speed from the landing strip up to an altitude of 1000 feet below this one at a slope $\gamma 2$ that is generally −3°, or any other slope indicated by the procedure agreed with the air traffic controller. Above 1000 feet, one considers that the engines are close to idling and one determines the speed at the intersection point with the glide slope (for instance 3000 feet or else $H_{CAPTURE}$). Here, one takes into account the transition from the first intermediate position of the slats and flaps to their second intermediate position. Here, one must consider that this transition takes place at a speed below SN (and not S) so as to take into account the deployment time of the slats and wing flaps.

Always while calculating in reverse, from the capture altitude of the glide slope and of the speed of the aircraft at this location, altitude $H_{MIN}$ is determined at which the aircraft is flying at a speed GDN and moves from the position in which the slats (and flaps) are occupying their first intermediate position to the smooth outside configuration (slats and flaps retracted), while taking into account the time needed for deploying the slats and flaps.

One considers that this segment is covered with a constant flight path angle γ1 located for instance between −2° and −2.5°. This flight path angle is selected as high as possible as an absolute value to remove the overflight path as much as possible and sufficiently low to permit optimal deceleration (sufficiently strong so as not to extend the flight path unnecessarily) up to speed GDN and can depend for instance of the weight and type of aircraft.

Calculations of the third and the last segment are tied together. Indeed, from the geometric begin descent position of the plane (altitude, longitudinal position), speeds of begin descent and of the second GDN segment and the altitude of end of the third segment $H_{GDN}$ as well as the length of the segment necessary so that the plane may reach, from the begin descent altitude, altitude $H_{GDN}$ at speed GDN, which permits determining altitude $H_{GDN}$ and as such, the end of the third segment.

In this third stage of calculation, one considers that the aircraft is climbing at a constant speed corresponding to speed GDN, to an altitude $H_{GDN}$. One considers here, when transitioning from altitude $H_{MIN}$ to altitude $H_{GDN}$ that the engines are close to idling, with a thrust margin during the design of the profile that permits, during the actual approach, absorbing inaccuracies linked to plane weight data, to that of the wind model used by FMS, to that of the calculations and to that of actual guidance. The flight path angle is for instance −3°.

Figure 2B:
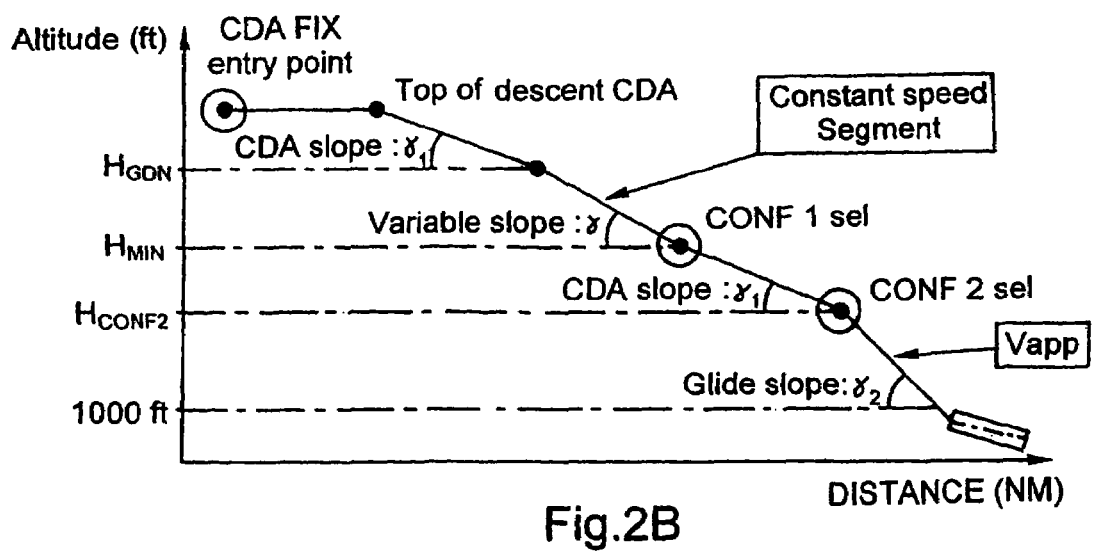
FIG. 2B is a diagram illustrating a variant of the landing procedure of FIG. 2A.
Figure 3:
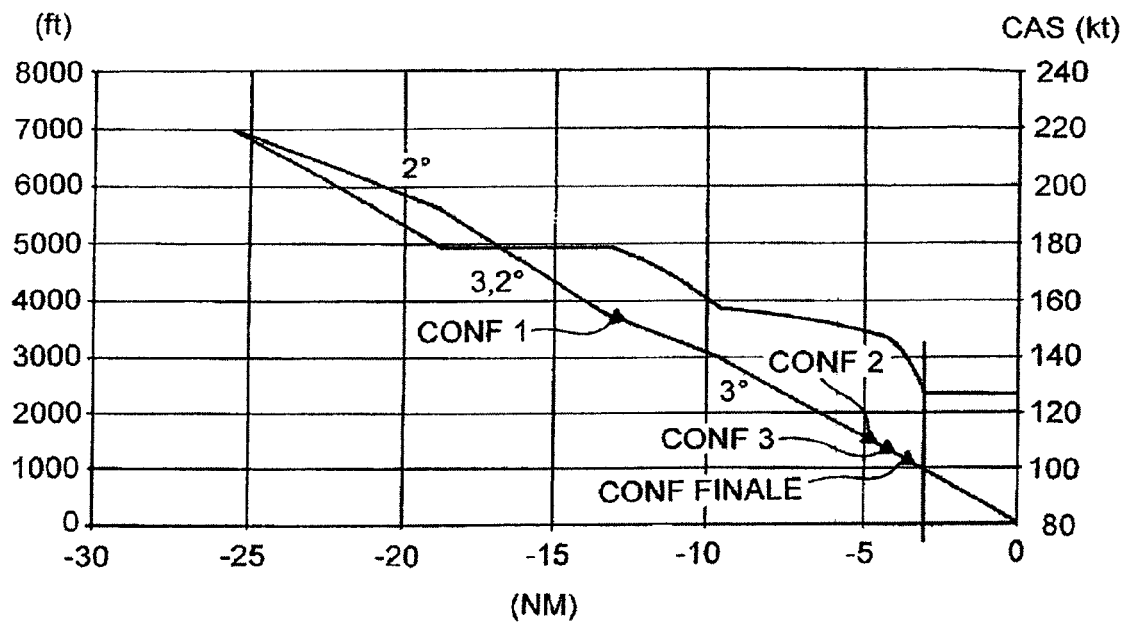
FIG. 3 shows a landing profile example according to the invention showing the speed and altitude of the aircraft according to the distance separating it from the landing strip.

A variant of the optimized CDA landing procedure is represented by FIG. 2B. The path parts common to FIGS. 2A and 2B as well as the corresponding calculation stages (first three stages below), will not be described again.

According to this variant, in a fourth calculation stage, one considers for defining the profile that the plane climbs to slope γ1 defined previously, by accelerating, until it reaches the altitude programmed for the beginning of the DCA at a speed lower than the one of end of descent.

During the fifth and last segment foreseen for this mode of execution, the plane accelerates at level until reaching the speed of end of descent, then continues at constant speed up to the point that the aircraft starts its optimized CDA procedure, the so-called "CDA Fix Entry Point". The speed of end of descent mentioned above is directly or indirectly controlled by the crew, or dictated by the crew, or by the flight management system (FMS), resulting from the classic optimizations conducted by the latter, for instance by meeting a flight duration/fuel consumption criterion, or by meeting an imposed arrival time, for instance to the "CDA Fix Entry Point".

Here, it is not a question of doing away with values like GD and S for instance from the flight management system memory of the aircraft. Here, values GDN and SN must be added into this memory. Indeed, on the one hand, values GD and S are used not only during landing but also during takeoff and on the other hand, under certain flight conditions, it may be necessary, for safety and/or comfort reasons to extend the slats at speed GD and the flaps at speed S (and not at GDN and SN).

For the transition to a given configuration, corresponding to an intermediate extended position of the slats and flaps, there is a required transition speed as well as a VLS speed (Limit Selection Speed) below which the transition to the configuration considered must not be undertaken (such as for reasons of flight safety). These speed ranges depend on the type of aircraft as well as its weight.

As an example, let us assume that for an aircraft with a weight of 180 tons, the classic GD speed recommended to extend the slats (transition to CONF1) is 230 kt (1 kt=1.852 kms/hr). The minimum speed for transitioning to the first intermediate position of the slats and flaps (CONF1) is for instance VLS1=195 kt. The speed interval length for which the transition to CONF1 is possible is 35 kt. To limit the ground noises, one must select a speed GDN as closely as possible to VLS1. However, for safety and airworthiness reasons, a margin must be preserved.

In such case, one can select GDN=215 kt (or GDN=VLS1+ 20 kt). Then, with respect to the equations defined above, we get $\Delta 1$=15 kt.

For this same plane, speed S corresponding to the extension of the flaps and as such transition to the second intermediate position of the slats and flaps (CONF2) is for instance 186 kt. Minimum speed for transitioning to CONF2 is for instance VLS2=161 kt. Here, we have selected SN=166 kt for instance.

The flight management system proposed here includes classically, an alphanumeric keyboard and a Multi Function Control and Display Unit (MCDU). During the takeoff and landing phases, speed GD is displayed on the MCDU. Here, the invention proposes a form of execution that provides for a landing phase, that the MCDU also displays the GDN speed that permits reducing the aircraft noise by flying with a smooth configuration. The specific procedures of the invention are also stored for instance in the navigational databases comprises the specific procedures at the airports. Speed information is displayed on the PFD (Primary Flight Display).

It must be pointed out here that the GD (Green Dot) speed is initially the speed that when an engine has failed, enables the best climbing speed. This speed is also used in general as final takeoff speed. In the previous state of the art, it is also the speed recommended from which the slats (and/or possibly the flaps) of an aircraft can be extended during an approach at a landing strip.

Likewise, speed S is for takeoff and for landing. At takeoff, it is the speed above which the outside configuration of the aircraft can be fully smooth (transition to CONF0). During landing, it is the classic speed for extending the flaps (in other words, transition to CONF2).

There are also speeds recommended for transitioning to the third intermediate position of the slats and flaps (CONF3) as well as for transitioning to the final configuration during which the slats and flaps are fully extended. These speeds are used only during landing. As for speed S, these speeds are for instance displayed on the MCDU. Here, it is proposed to display speed SN also on this device, as well as the GDN speed.

Here it is pointed out that the landing gear is extended preferably after transitioning to the third intermediate position of the slats and flaps, or CONF3.

Figure 4:
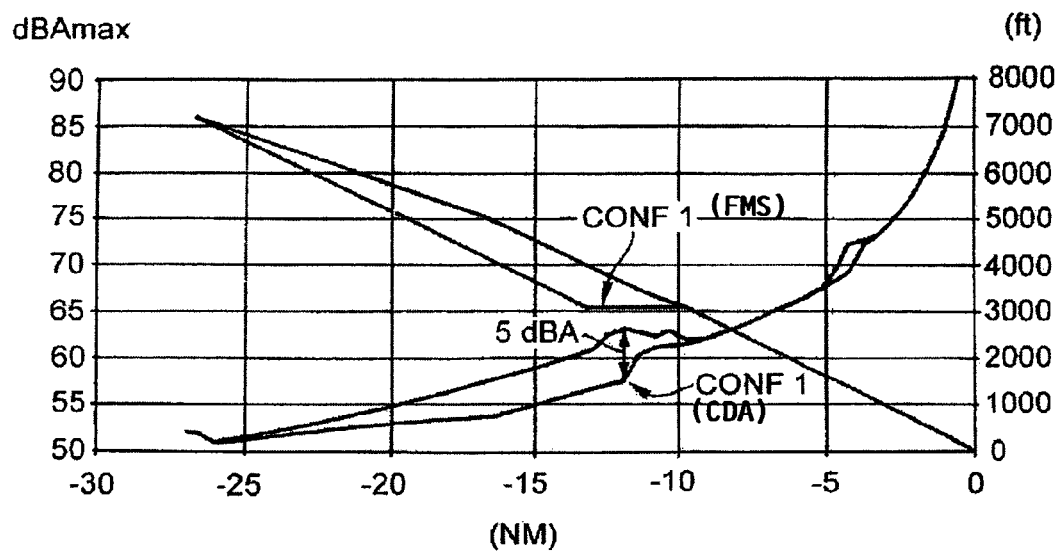
FIG. 4 illustrates for a given aircraft model the gain in terms of noise obtained thanks to the optimized landing process according to the invention.

The approach procedure for a landing strip described above permits limiting to a considerable extent the ground noises near this landing strip. FIG. 4 illustrates the gain obtained. On this figure, we have shown the aircraft path, in other words, the altitude of the aircraft with respect to the distance to the landing strip and on the other hand, the ground noise on the basis also of the landing strip distance. Logically speaking, the curves involving the noise overlap on the one hand when the aircraft is flying at cruising speed and at the beginning of descent and on the other hand, at the time of landing when the landing procedure does not impact the last flight segment before reaching the landing strip. The end-of-flight glide slope is not modified during a landing procedure according to the invention.

The process according to the invention also permits a reduction of fuel consumption of the aircraft.

This invention is not limited to the preferred form of execution described above as a non-limiting example. It also involves all variations of execution within reach of the technical expert for the claims that follow.

The invention claimed is:

1. A flight management process for landing an aircraft at an airport, said aircraft comprising aerodynamic wing flaps that are movable between a fully retracted position and a fully extended position while transitioning through intermediate positions, wherein said process for landing comprises four consecutive linear descent flight paths and the steps of:
    following a first linear descent flight path during which said aircraft decelerates from a begin descent speed and a begin descent altitude of the aircraft, wherein said first linear descent flight path has a first flight path angle and lasts until said aircraft reaches a predetermined speed, and wherein during said first linear descent flight path, said flaps transition from the fully retracted position to a first intermediate position,
    following a second linear descent flight path during which said aircraft maintains a substantially constant speed, wherein said second linear descent flight path has a second flight path angle that is different from said first flight path angle,
    following a third linear descent flight path during which said aircraft decelerates, wherein said third linear descent flight path has a third flight path angle that is different from said second flight path angle and continues until said aircraft reaches a glide slope interception position,
    extending the flaps to assume said first intermediate position, when transitioning from the second to the third linear descent flight paths; and
    following a fourth linear descent flight path from said glide slope interception position, wherein during said fourth linear descent flight path, said aircraft follows a glide slope for said airport.

2. The flight management process according to claim 1, wherein the first and third flight path angles are equal, and the second flight path angle is higher, in absolute value, to the first and third flight path angles.

3. The flight management process according to claim 1, wherein the flaps transition to a second intermediate extended position, then, to a third intermediate extended position and the landing gear is only extended when the flaps are in said third intermediate position that coincides eventually with a final landing position.

4. The flight management process according to claim 1, wherein the flaps transition to said first intermediate position when the aircraft reaches a speed lower than a speed required to transition to the first intermediate position for a landing consisting of less than four linear descent flight paths.

5. The flight management process according to claim 3, wherein the flaps move to a second intermediate position when the aircraft reaches a speed lower than a speed required to transition to the second intermediate position for a landing consisting of less than four linear descent flight paths.

6. The flight management process according to claim 1, further comprising, prior to landing, calculating angles, speeds, and flap configurations for said four linear descent flight paths.

7. The flight management process according to claim 6, wherein said calculating is performed in reverse and includes the following steps:
    from a landing strip level, determining a first flight segment at landing speed and a flight path angle that coincides with the glide slope foreseen for this landing strip and that is memorized in a navigation system of the aircraft;
    from a predetermined altitude, calculating a second flight segment with a same flight path angle of the acceleration in reverse of the aircraft up to an altitude that intercepts the glide slope, while this calculation takes into account a possible change in configuration of the flaps of the aircraft at a speed that depends on the type of plane and its weight;
    from the interception altitude of the glide slope, calculating a third flight segment until the aircraft reaches a predetermined speed corresponding to the transition of the external smooth configuration of the aircraft at the first intermediate position of the flaps and determination of the corresponding altitude, with the flight path angle having been predetermined,
    calculating a fourth path segment of the aircraft path from the altitude determined during the previous phase, at constant speed, and
    calculating a fifth path segment, in the direction of travel of the aircraft, from the point of the begin descent path, to transition, possibly at constant altitude, from the aircraft speed at the begin descent speed that coincides with the transition of the external smooth configuration of the aircraft to the first intermediate position of the flaps, and intersection of this fifth segment with the fourth to determine the begin descent path of the aircraft.

8. The flight management process according to claim 1, comprising, during descent of the aircraft to a landing strip, proposing to the pilot to go from a smooth external configuration of the aircraft to the first intermediate position of the flaps either at a first speed that coincides with a recommended speed for transitioning to the first intermediate position of the flaps, or at a speed lower than the recommended speed, and that permits reducing the aircraft noise.

9. The flight management process according to claim 3, comprising, during descent of the aircraft towards a landing strip, proposing to the pilot to transition from the first intermediate position of the flaps of the aircraft to the second intermediate position or to a first speed that coincides with a recommended speed for transitioning to the second intermediate position of the flaps, or at a speed lower than the recommended speed, and that permits reducing the aircraft noise.

* * * * *